United States Patent [19]

Evans et al.

[11] Patent Number: 5,275,260
[45] Date of Patent: Jan. 4, 1994

[54] DUAL MODE DRUM BRAKE ASSEMBLY

[75] Inventors: Anthony C. Evans; Larry Last, both of Northville, Mich.

[73] Assignee: Kelsey-Hayes Company, Romulus, Mich.

[21] Appl. No.: 996,559

[22] Filed: Dec. 24, 1992

Related U.S. Application Data

[63] Continuation-in-part of Ser. No. 805,413, Dec. 10, 1991, abandoned, which is a continuation-in-part of Ser. No. 408,857, Sep. 18, 1989, Pat. No. 5,070,968.

[51] Int. Cl.⁵ .................................................. F16D 51/06
[52] U.S. Cl. ................................. 188/79.64; 188/106 A
[58] Field of Search ............... 188/79.54, 79.63, 79.64, 188/106; 192/111

[56] References Cited

U.S. PATENT DOCUMENTS

| | | | |
|---|---|---|---|
| 2,219,764 | 10/1940 | Chaminade | 188/106 A |
| 3,292,745 | 12/1966 | Dombeck | 188/106 A X |
| 3,400,787 | 9/1968 | Keller | 188/106 |
| 3,708,044 | 1/1973 | Torri et al. | 188/106 F |
| 3,709,334 | 1/1973 | Kondo et al. | 188/106 A X |
| 4,364,456 | 12/1982 | Colpaert | 188/106 A |
| 4,387,792 | 1/1983 | Imamura | 188/106 F X |
| 4,401,195 | 8/1983 | Last | 188/196 BA X |
| 4,595,084 | 6/1986 | Le Deit | 188/106 A X |
| 4,678,067 | 7/1987 | Thompson | 188/106 F X |
| 4,768,631 | 9/1988 | Heibel | 188/106 A X |
| 5,070,968 | 12/1991 | Evans | 188/79.64 |

FOREIGN PATENT DOCUMENTS

| | | | |
|---|---|---|---|
| 516048 | 12/1979 | Australia | |
| 0075238 | 6/1981 | Japan | 188/106 F |

Primary Examiner—Robert J. Oberleitner
Assistant Examiner—Peter M. Poon
Attorney, Agent, or Firm—MacMillan, Sobanski & Todd

[57] ABSTRACT

A dual mode drum brake assembly having an improved duo-servo parking and emergency brake lever mechanism includes a pivot lever pivotally supported relative to a first brake shoe and operatively coupled to exert an outward force on the first brake shoe when the parking brake is actuated. According to one feature of the invention, a hold down assembly extends through an aperture formed in a web of the first brake shoe, and through an aperture formed in the pivot lever to secure the first brake shoe to a backing plate and to pivotally connect the pivot lever to the web. According to another feature of the invention, an adjuster lever of a first strut member is pivotally supported on the first brake shoe, and the pivot lever is pivotally supported on the first brake shoe generally intermediate the first strut member and a second strut member.

11 Claims, 6 Drawing Sheets

DUAL MODE DRUM BRAKE ASSEMBLY

CROSS-REFERENCE TO RELATED APPLICATIONS

This application is a continuation-in-part of U.S. patent Ser. No. 07/805,413, filed Dec. 10, 1991, which is a continuation-in-part of U.S. patent Ser. No. 07/408,857, filed Sep. 18, 1989, now U.S. Pat. No. 5,070,968.

BACKGROUND OF THE INVENTION

This invention relates in general to a "dual mode" drum brake assembly which includes a hydraulically actuated service brake of the leading/trailing type, and a mechanically actuated parking and emergency brake of the duo-servo type.

One version of a dual mode drum brake is disclosed in Australian Patent No. 53,491. In this patent, a hydraulic actuator, used for applying the service brakes, is located adjacent the upper ends of a pair of brake shoes, while a fixed abutment is located adjacent the lower ends. This arrangement provides a service brake of the leading/trailing type. The brake further includes an upper strut which is located adjacent the hydraulic actuator and extends between the brake shoes, and which is provided with an automatic adjusting mechanism. A parking brake actuating lever is pivotally mounted on a lower end of one brake shoe, and an idle lever is pivotally mounted at an intermediate point on the other brake shoe. A lower strut extends between the brake shoes adjacent the lower abutment and is disposed between a lower end of the parking brake lever and a lower end of the idle lever. When pivoted, the parking brake actuating lever extends the effective length of the lower strut and pivots the idle lever to initiate duo-servo actuation of the parking brake Other versions of dual mode drum brakes are disclosed in U.S. Pat. No. 3,400,787 to Keller et al., U.S. Pat. No. 3,709,334 to Kondo et al., U.S. Pat. No. 4,364,456 to Colpaert, and U.S. Pat. No. 4,678,067 to Thompson.

SUMMARY OF THE INVENTION

This invention relates to a dual mode drum brake assembly having an improved duo-servo parking and emergency brake lever mechanism. The brake assembly includes first and second opposed arcuate brake shoes supported relative to a backing plate and moveable outwardly into frictional engagement with an associated brake drum upon actuation of either the service brake or the parking and emergency brake. A hydraulic actuator is secured relative to the backing plate and is disposed between and engageable with a first pair of adjacent ends of the brake shoes for hydraulically actuating the service brake. A rotation preventing abutment is secured relative to the backing plate and is disposed between and engageable with a second pair of adjacent ends of the brake shoes. Each of the brake shoes is provided with an arcuate table for supporting a friction pad and a web connected to the table. The web is provided with an aperture formed intermediate the ends thereof.

A pivot lever is pivotally supported relative to the first brake shoe and is operatively coupled to exert an outward force on the first brake shoe when the parking and emergency brake is mechanically actuated. The pivot lever is provided with an aperture formed intermediate the ends thereof. First strut means is disposed adjacent the hydraulic actuator and includes one end coupled to the second brake shoe and an opposite end coupled to one end of the pivot lever. The first strut means includes an adjuster lever for automatically adjusting the effective length of the first strut means to compensate for wear of the brake shoes. Second strut means is disposed adjacent the rotation preventing abutment Parking and emergency brake actuating means is carried by the brake assembly for mechanically actuating the pivot lever to urge the first brake shoe outwardly into engagement with the brake drum and thereby initiate duo-servo actuation of the parking and emergency brake through one of the first and second strut means. The second strut means includes one end coupled to one end of the parking and emergency brake actuating means, and an opposite end coupled to the other end of the pivot lever. Hold down means extends through the aperture of the web of the first brake shoe to secure the first brake shoe to the backing plate. According to one feature of the invention, the hold down means extends through the aperture formed in a web of the first brake shoe, and through the aperture formed in the pivot lever to secure the first brake shoe to the backing plate and to pivotally connect the pivot lever to the web of the first brake shoe. According to another feature of the invention, the adjuster lever of the first strut means is pivotally supported on the first brake shoe, and the pivot lever is pivotally supported on the first brake shoe generally intermediate the first strut means and the second strut means.

The above, as well as additional features of the invention, are illustrated in the accompanying drawings, and are further discussed in the following sections.

DETAILED DESCRIPTION OF THE PREFERRED EMBODIMENT

Figure 1:
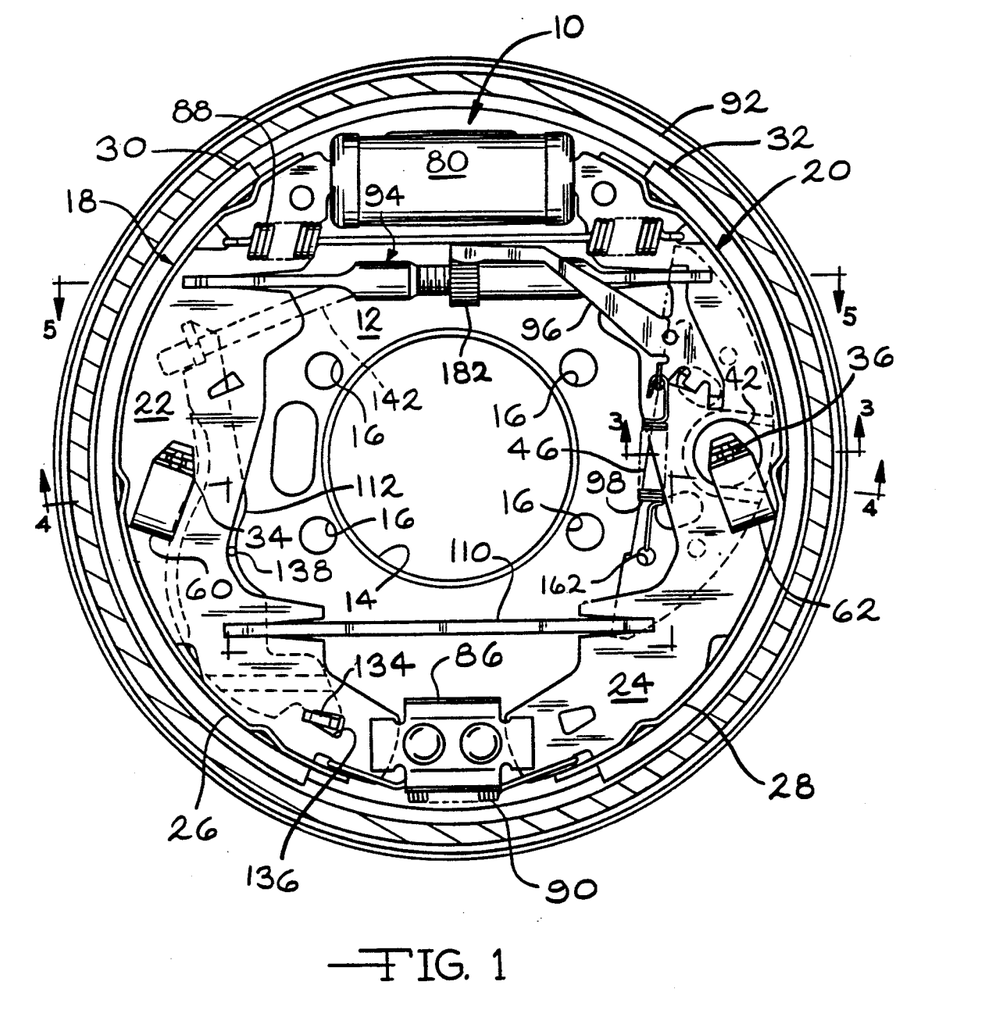
FIG. 1 is an outboard elevational view of a dual mode drum brake assembly having an improved duo-servo parking and emergency brake lever mechanism constructed in accordance with the present invention.
Figure 2:
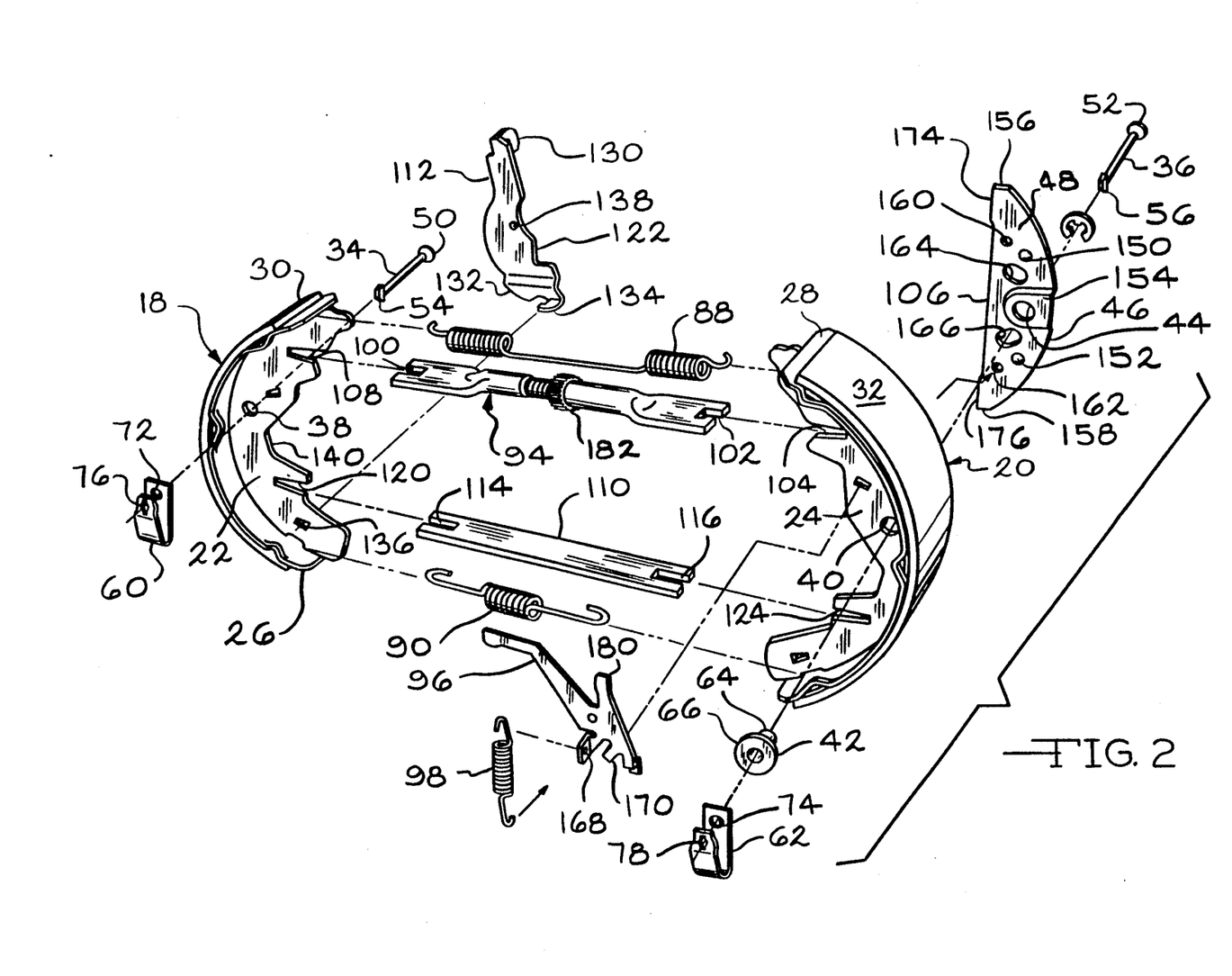
FIG. 2 is an exploded pictorial view of the various parts of the drum brake assembly shown in FIG. 1.

Referring now to the drawings, there is illustrated in FIGS. 1 and 2 a dual mode drum brake assembly, indicated generally at 10, and constructed in accordance with the present invention. The brake assembly 10 includes a hydraulically actuated service brake of the leading/trailing type, and a mechanically actuated parking and emergency brake of the duo-servo type. The drum brake assembly 10 illustrated is associated with a right rear wheel of a vehicle. The brake assembly 10 includes a backing plate 12 provided with a central opening 14 and four holes 16 formed therein. The central opening 14 receives an end of the vehicle axle (not shown) and the holes 16 are adapted to receive bolts (not shown) in order to mount the backing plate 12, and therefore the brake assembly 10, on the vehicle axle.

The brake assembly 10 includes a first brake shoe 18 and an oppositely disposed second brake shoe 20. The first and second brake shoes 18 and 20 include webs 22 and 24, respectively, having arcuate tables 26 and 28. An arcuate friction pad 30 is secured to the first brake shoe table 26 and an arcuate friction pad 32 is secured to the second brake shoe table 28. The first and second brake shoes 18 and 20 are secured to the backing plate 12 by pins 34 and 36, respectively. The pins 34 and 36 extend through apertures 38 and 40, respectively, formed in the webs 22 and 24 of the brake shoes 18 and 20. As will be discussed, the pin 36 also extends through a hollow pivot sleeve 42 which is inserted in a centrally located aperture 44 formed in a pivot lever 46 and the aperture 40 of the web 24 of the second brake shoe 20, in order to pivotally support the pivot lever 46 on the second brake shoe 20.

Figure 3:
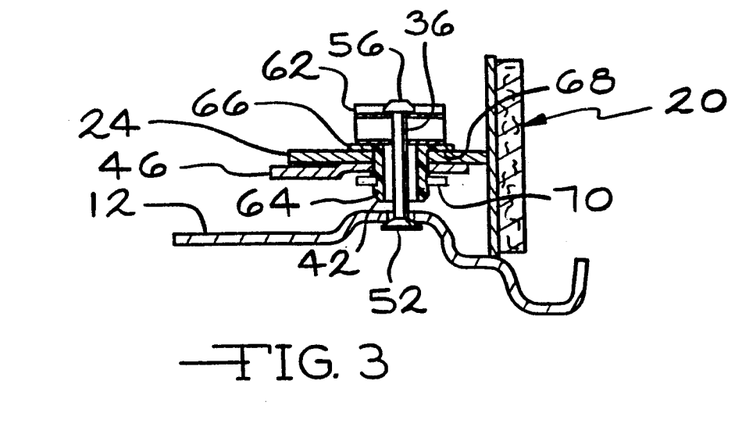
FIG. 3 is a cross sectional view taken along line 3—3 of FIG. 1.

As shown in FIG. 2, the pins 34 and 36 are provided with enlarged heads 50 and 52, and flattened, wedge-shaped opposite ends 54 and 56, respectively. The enlarged head 52 of pin 36 engages the inboard side of the backing plate 12, as shown in FIG. 3. In a similar manner, the enlarged head 50 of pin 34 engages the inboard side of the backing plate 12 (not illustrated). The body portion of the pin 36 extends through the hollow pivot sleeve 42 installed in the web 24 of brake shoe 20 and the pivot lever 46, and through a generally U-shaped spring-clip retainer 62 in order to pivotally connect the pivot lever 46 to the web 24 of brake shoe 20. A body portion of the pin 34 extends through the web 22 of brake shoe 18, and through a generally U-shaped spring clip retainer 60.

As shown in FIG. 3, the hollow pivot sleeve 42 includes a generally cylindrical elongated body having a first portion 64, which defines a first outer diameter, and a second portion 66, which defines a second outer diameter greater than the first. A shoulder 68 is defined between the first portion 64 and the second portion 66 The first portion 64 provides an outer bearing surface for permitting the pivot lever 46 to pivot relative to the brake shoe 20, and for transmitting force from the lever 46 to the web 24, in a manner as will be discussed. The shoulder 68 engages the outboard side of the web 24 of brake shoe 20. A snap ring 70 is installed on the first portion 64 of the hollow pivot sleeve 42 to retain the pivot lever 46 adjacent the web 24 of brake shoe 20.

The U-shaped spring-clip retainers 60 and 62 are provided with a pair of apertures 72 and 74, and a pair of slots 76 and 78, respectively. The flattened, wedge-shaped ends 54 and 56 of the pins 34 and 36 extend through the apertures 72 and 74 and the slots 76 and 78 and then are turned ninety degrees while the spring-clips 60 and 62 are compressed, and held stationary. The spring-clips 60 and 62 are then released, and the wedge-shaped ends 54 and 56, respectively, are received within depressions formed in the slots 76 and 78 of the spring-clips 60 and 62, thereby securing the brake shoes 18 and 20 to the backing plate 12.

A hydraulic actuator 80, shown in FIG. 1, is provided on the backing plate 12 between the upper ends of the webs 22 and 24 of the brake shoes 18 and 20, respectively. The actuator 80 includes a pair of pistons 82 and 84, shown schematically in FIGS. 6-9. An abutment block 86 is secured to the backing plate 12 and is disposed between the lower ends of the webs 22 and 24 of the brake shoes 18 and 20, respectively.

Further, the brake assembly 10 includes a first upper retracting spring 88 and a second lower retracting spring 90. The first retracting spring 88 is disposed adjacent the hydraulic actuator 80 and connected between the upper ends of the webs 22 and 24 of the brake shoes 18 and 20, respectively. The second retracting spring 90 is disposed adjacent the abutment block 86 and connected between the lower ends of the webs 22 and 24 of the brake shoes 18 and 20, respectively The abutment block 86 cooperates with the hydraulic actuator 80 during actuation of the service brake to transfer braking torque to the frame of the vehicle.

The operation of the pistons 82 and 84 of the hydraulic actuator 80 are well known in the art and move outwardly from the opposite ends of the hydraulic actuator 80 to expand the springs 88 and 90 upon an increase of hydraulic fluid pressure This forces the friction pads 30 and 32 of the brake shoes 18 and 20, respectively, into frictional engagement with a brake drum 92 during service brake operation. When the hydraulic fluid to the pistons 82 and 84 of the hydraulic actuator 80 is released, the brake shoe retracting springs 88 and 90 bias the brake shoes 18 and 20 away from engagement with the brake drum 92 to their disengaged positions shown in FIG. 1.

Figure 5:
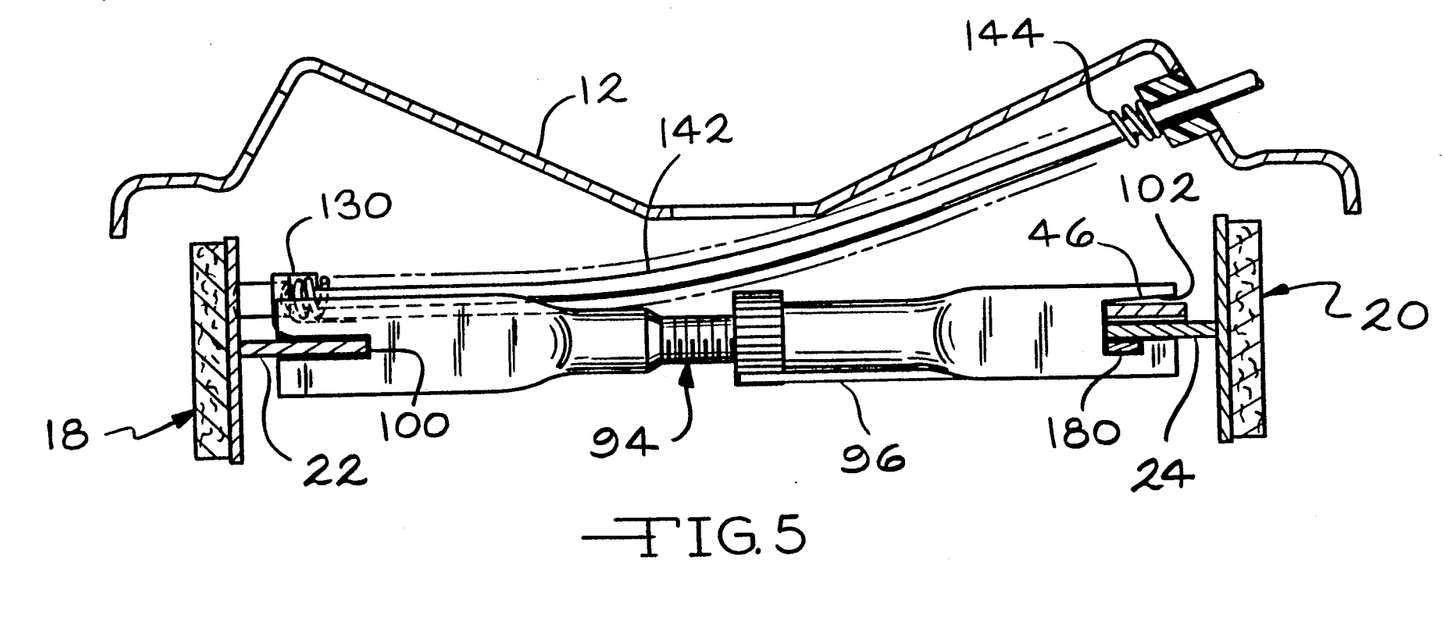
FIG. 5 is a cross sectional view taken along line 5—5 of FIG. 1.

A composite expansible upper strut 94 is located below the first retracting spring 88. The strut 94 is operatively coupled at one end with the web 24 of the brake shoe 20 and the pivot lever 46, and at its other end with the web 22 of the other brake shoe 18. The strut 94 serves as part of the duo-servo parking and emergency brake lever mechanism, as will be explained, and also serves as part of an automatic brake adjusting mechanism which can be of the type disclosed in U.S. Pat. No. 4,401,195, and herein incorporated by reference. Briefly, the automatic brake adjusting mechanism includes an adjuster lever 96 and a spring 98. The strut 94 includes bifurcated ends which define opposed slots 100 and 102 therein. As best shown in FIG. 5, the slot 102 is operatively coupled with the web 24 of brake shoe 20 at a notch 104 provided therein, with the pivot lever 46 along an edge surface 106 thereof, and with an upper arm 180 of the adjuster lever 96. The slot 100 is operatively coupled with the web 22 of brake shoe 18 at a notch 108 provided therein.

Figure 4:
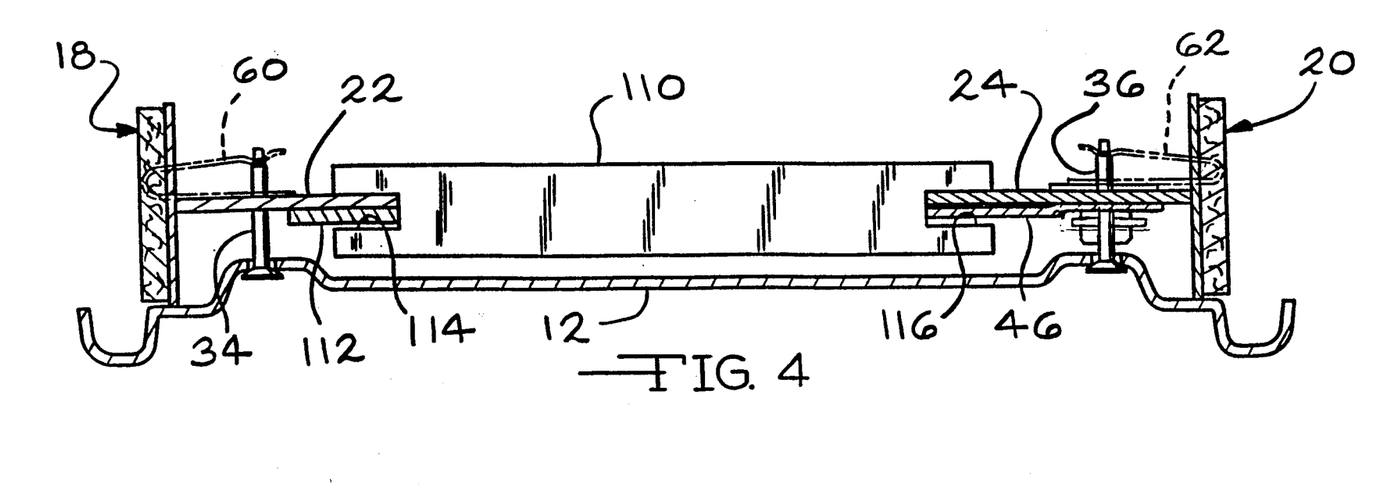
FIG. 4 is a cross sectional view taken along line 4—4 of FIG. 1.

The parking and emergency brake lever mechanism includes a lower link or strut 110, an actuating lever 112, and the pivot lever 46. The lower link 110 is provided with identical length and width notches 114 and 116 on its opposite ends. As shown in FIG. 4, the slot 114 is operatively coupled with a notch 120 in the web 22 of brake shoe 18, and an edge surface 122 of the actuating lever 112 The opposed slot 116 of the link 110 is operatively coupled with the web 24 of brake shoe 20 at a notch 124 provided therein, and with the pivot lever 46 along the edge surface 106 thereof.

The actuating lever 112 is provided with a reversely bent back upper end 130 and an offset lower end 132 having an arm 134. The arm 134 is received in an opening 136 formed in the web 22 of brake shoe 18 to pivotally mount the actuating lever 112 on the brake shoe 18. A projection 138 is provided on a surface of the actuating lever 112. As will be discussed, the projection 138 normally engages an edge surface 140 of the web 22 of brake shoe 18 when the actuating lever 112 is in its inoperative position.

As best shown in FIG. 5, the reversely bent back upper end 130 of the actuating lever 112 is adapted to receive an end of a parking and emergency brake cable 142 which extends through an opening provided in the backing plate 12. A return spring 144 is disposed on the cable 142 between the upper end 130 of the lever 112 and a portion 144 of the backing plate 12. The return spring 144 normally biases the cable 142, and therefore the actuating lever 112 to the inoperative position, shown in FIG. 1, wherein the brake shoes 18 and 20 do not operatively engage the brake drum 92.

The pivot lever 46 includes a generally flat edge surface 106, a main body 48 preferably having a pair of dimples 150 and 152, a raised generally U-shaped portion 154, and an aperture 44 formed therein. The aperture 44 is equally spaced between opposed ends 156 and 158 of the pivot lever 46, and the dimples 150 and 152 are equally spaced relative to the aperture 44. The pivot lever 46 further includes a first pair of apertures 160 and 162 equally spaced relative to the aperture 156, and a second pair of apertures 164 and 166 equally spaced relative to the aperture 44. The ends 156 and 158 of the pivot lever 46 are identical and include generally flat edge surfaces, 174 and 176, respectively, which are non-planar relative the flat edge surface 106. The flat edge surfaces 174 and 176 operatively connect the pivot lever 46 to the upper strut 94 and the lower strut 110, respectively.

As best shown in FIG. 1, one end of the spring 98 is disposed in the aperture 162 of the pivot lever 46, and the other end of the spring 98 is disposed in an aperture 168 provided in the adjuster lever 96 of the automatic brake adjusting mechanism. Also, when the adjuster lever 96 is mounted on the web 24 of brake shoe 20, the aperture 164 of the pivot lever 46 provides clearance for an end 170 of the adjuster lever 96 which extends through an aperture 172 provided in the web 24. In addition, since the dimples 150 and 152 and the U-shaped portion 154 are raised relative to the main body 48 of the pivot lever 46, when the pivot lever 46 is pivotally connected to the web 24 of brake shoe 20 only the outer end surfaces of the dimples 150 and 152 and the U-shaped portion 154 engage the inboard side of the web 24. As a result of this, only a relatively small surface contact area is formed between the pivot lever 46 and the web 24, thereby reducing the frictional forces between the lever 46 and the web 24.

Figure 6:
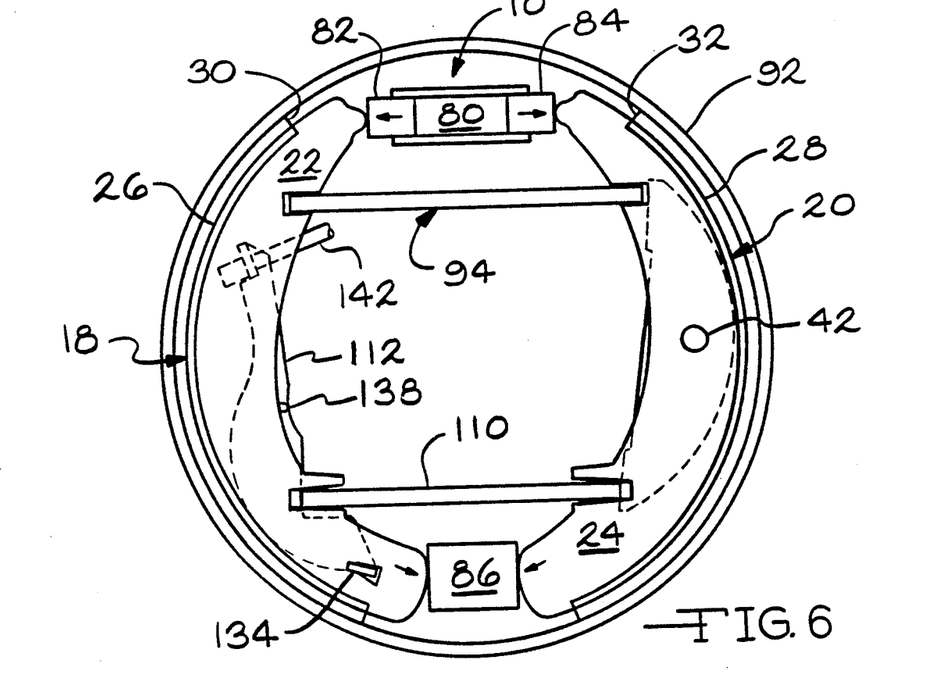
FIG. 6 is a schematic view showing various parts of the drum brake assembly with only the hydraulic service brake applied.

Turning now to FIGS. 6-9, the operation of the brake assembly 10 will be explained. FIG. 6 illustrates the positions of the brake components when only the hydraulic actuator 80 is actuated to apply the service brake. When the hydraulic actuator 80 is actuated, the pistons 82 and 84 overcome the force of the spring 88 and are extended from their normal retracted positions and move outwardly from the opposite ends of the hydraulic actuator 80. As the pistons 82 and 84 are moved outwardly, they engage the upper ends of the brake shoe webs 22 and 24 and force the friction pads 30 and 32, respectively, into frictional engagement with brake drum 92 to activate the service brake.

In addition, the lower ends of the brake shoe webs 22 and 24 engage the abutment block 86. Thus, if the brake drum 92 receives a clockwise torque as viewed in FIG. 6, the brake shoe 20 acts as a leading shoe due to the frictional force exerted by the drum 92 against the brake shoe 20, while the other brake shoe 18 acts as a trailing shoe. Conversely, if the brake drum receives a counter-clockwise torque, the brake shoe 18 would act as the leading shoe and the other brake shoe 20 would act as the trailing shoe. Accordingly, the drum brake assembly 10 functions as a leading/trailing type brake during hydraulic actuation of the service brake.

Figure 7:
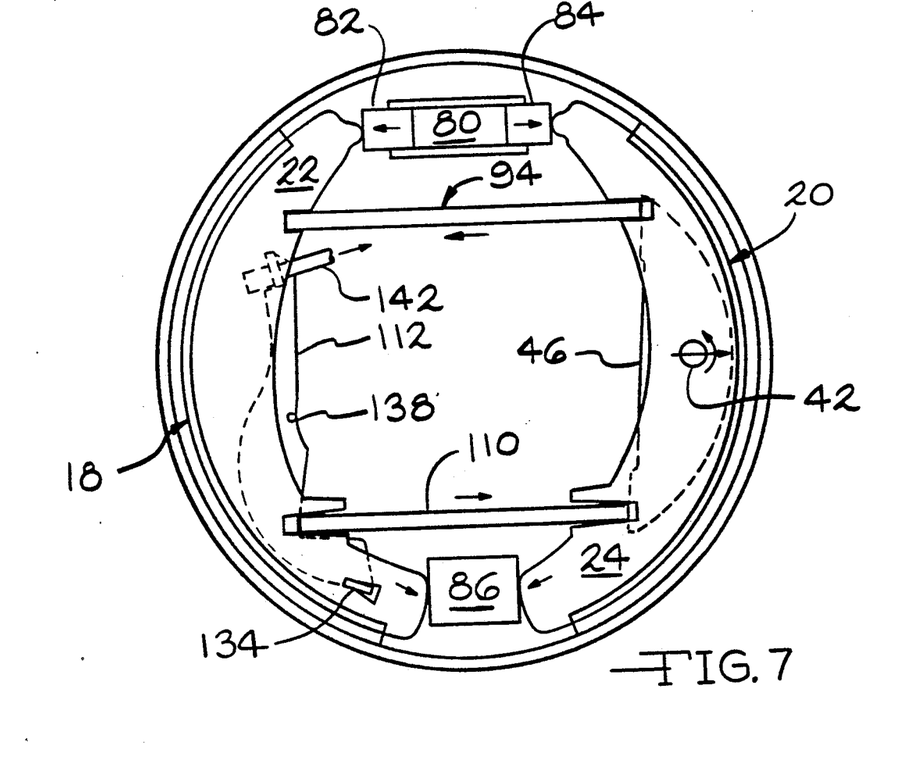
FIG. 7 is a schematic view showing various parts of the drum brake assembly with both the hydraulic service brake and the mechanical parking and emergency brake applied.

In FIG. 7, the positions of the brake components are illustrated when the mechanical parking and emergency brake is actuated while the service brake remains applied. When the parking and emergency brake cable 142 is actuated, the force of the return spring 144 is overcome and the actuating lever 112 is pulled to right (as shown in the drawing) and pivots clockwise relative to the brake shoe 18 about its pivotal connection therewith, designated in the drawings by arm 134. This causes the lever 112 to engage and move the lower strut 110 to the right in the drawing so that the lower strut 110 engages the lower end of the pivot lever 46 and causes the pivot lever 46 to pivot counterclockwise about the pivot sleeve 42. As a result of this pivoting movement, the upper end of the pivot lever 46 engages the upper strut 94 and moves strut 94 to the left into positive engagement with the web 22 of brake shoe 18.

In addition to the pivot lever 46 pivoting counter-clockwise about pivot sleeve 42, the pivot lever 46 is operative to exert a radial outward force on the brake shoe 20 via hollow pivot sleeve 42. Thus, it can be seen that the left end of upper link 94 engages the web 22 of brake shoe 18 and that the lower end of the actuating lever 112 via arm 134 engages the web 22 of brake shoe 18 to force the brake shoe 18 against the brake drum 92. The right end of the lower link 110 engages the lower end of the pivot lever 46, and the pivot lever 46 engages the right end of the upper link 94. However, the right ends of the links 94 and 110 do not directly exert any radial outward force on the brake shoe 20. The radial outward force on the brake shoe 20 is transmitted by the pivot lever 46 at its pivotal connection therewith, designated in the drawings by the hollow pivot sleeve 42.

Figure 8:
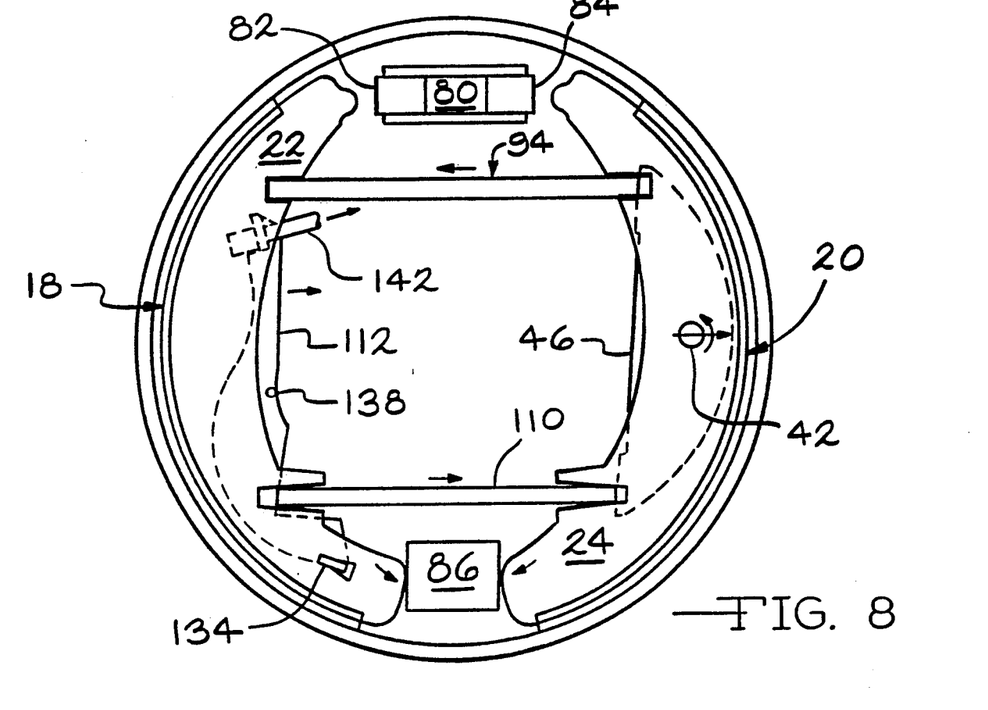
FIG. 8 is a schematic view showing various parts of the drum brake assembly with the hydraulic service brake released and the mechanical parking and emergency brake applied.

In FIG. 8, the positions of the brake components are illustrated when the hydraulic service brake is released while the mechanical parking and emergency brake remains applied. When the hydraulic actuator 80 is no longer actuated, the pistons 82 and 84 return to their normal retracted positions and the upper ends of the brake shoes 18 and 20 are spaced from the pistons 82 and 84, respectively. However, as long as the parking brake cable 142 is actuated, the actuating lever 112 and the pivot lever 46 are operative to maintain the friction surfaces 30 and 32 of the brake shoes 18 and 20, respectively, in braking engagement with the brake drum 92, and the lower ends of the brake shoes 18 and 20 are maintained in engagement with the abutment member 86.

Figure 9:
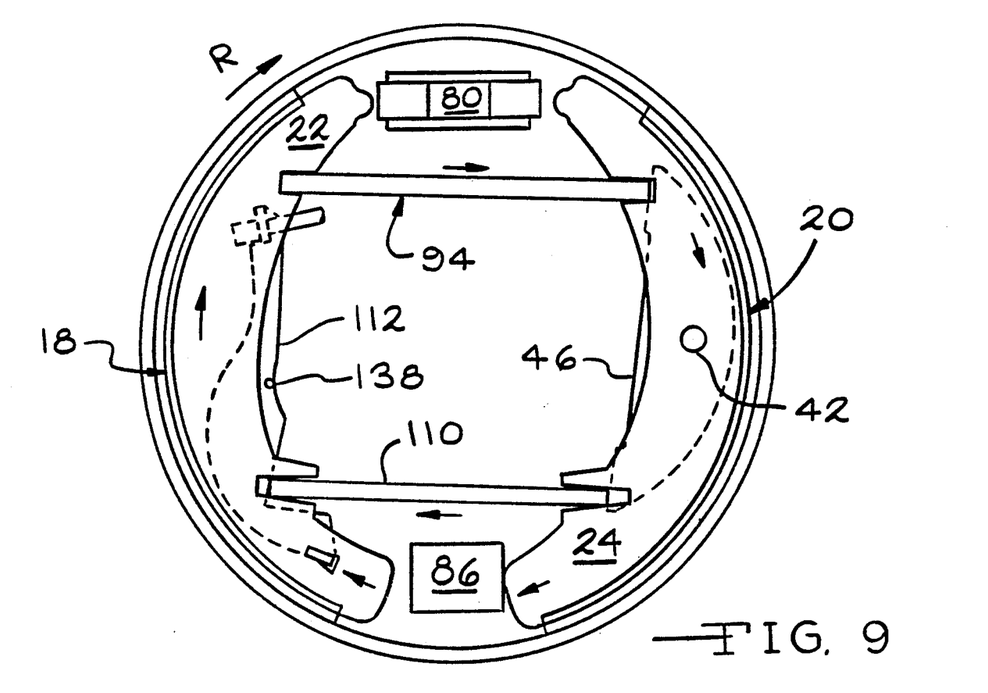
FIG. 9 is a schematic view showing various parts of the drum brake assembly with only the mechanical parking and emergency brake applied and when the vehicle tends to move toward the right thereby effecting duo-servo actuation of the parking and emergency brake.

In FIG. 9, the positions of the brake components are illustrated when only the mechanical parking and emergency brake is applied and the vehicle tends to move to the right, as indicated by the arrow R in the drawing, thereby rotating the drum brake 92 in a clockwise direction. Upon clockwise rotation of the brake drum 92, the brake shoe 18 is dragged along with the drum 92 by its frictional engagement therewith and the lower end of the shoe 18 is moved from engagement with the abutment member 86. Since the upper strut 94 is effectively floating between the upper ends of the brake shoes 18 and 20, the movement of brake shoe 18 via the strut 94 forces the brake shoe 20 to rotate clockwise into further frictional engagement with the brake drum 92 as the lower end thereof engages the abutment member 86. Thus, the brake shoes 18 and 20 cooperate to provide a considerable amount of braking force in response to a relatively small amount of manual braking effort. Consequently, the brake assembly 10 of the present invention functions as a duo-servo mechanical parking and emergency brake.

Conversely, if the brake drum 92 rotates in a counterclockwise direction, the brake shoe 20 will be dragged along with the drum 92 and its lower end will move from engagement with the abutment member 86 so as to cause the upper strut 94 to force the brake shoe 18 into further engagement with the drum 92 as the lower end of the shoe 18 engages the abutment member 86. Thus, it can be seen that the brake assembly 10 of the present invention functions as a leading/trailing type of brake when the service brake is operated, and functions as a duo-servo type of brake when the mechanical parking and emergency brake is operated.

One advantage of the present invention is that the pin 36, pivot sleeve 42, and clip 62 cooperate to both support the brake shoe 20 relative to the backing plate 12 and also to pivotally connect the pivot lever 46 to the shoe 20. Since the brake shoe 20 is supported relative to the backing plate 12 using the pin 36 and the clip 62, it is advantageous to use the pivot sleeve 42 to pivotally support the pivot lever 46 at this point. As a result of connecting these components in this manner, a simpler construction is provided.

Another advantage of the present invention is that the spring 98 biases the pivot lever 46 to prevent rattling of the pivot lever 46 during vehicle operation. In addition, the aperture 162 of the pivot lever 46 is moved inwardly relative to the adjacent edge of the web 24 of brake shoe 20. Thus, connecting the spring 98 to the pivot lever 46 at aperture 162 increases the force of the adjuster lever 96 down onto a starwheel 182 of the automatic brake adjusting mechanism over that provided by a similar spring connected to the web of the brake shoe.

It must be understood that while the invention has been described and illustrated as pivotally supporting the actuating lever 112 on the web 22 of brake shoe 18, other arrangements are possible. For example, the actuating lever 112 can be pivotally supported on the lower link 110, or can be pivotally supported on the pivot lever 46, and still operate in a similar manner as described above. Also, the actuating lever 112 can be pivoted near the upper end of the brake shoe 18 so that it is operative to engage the adjacent end of the upper strut 94. In this arrangement, when the actuating lever is pivoted, the pivot lever via the lower link initiates duo-servo actuation of the parking and emergency brake.

In addition, while the pivot lever 46 has been described and illustrated as being located on the inboard side of the web 24 of brake shoe 20, the pivot lever 46 can be located on the outboard side of the web 24. Locating the pivot lever in such a manner results in the pivot lever being disposed between the shoulder 68 of the pivot sleeve 42 and the outboard side of the web 24 thereby eliminating the need for the snap ring 70. Also, the pivot lever 46 can be mounted on the web of the brake shoe not having the adjuster lever 96 mounted thereon. When the pivot lever is mounted in this manner, the spring 98 is connected between the adjuster lever 96 and the web of the adjacent brake shoe in a conventional manner.

Furthermore, instead of providing the dimples 150 and 152 on the pivot lever 46, the ends 156 and 158 of the lever can be offset relative to the main body 48 of the lever in order to space a major portion of the lever from the adjacent surface of the web 24.

The principles and mode of operation of the invention have been described and illustrated in its preferred embodiments. However, it must be understood that the invention may be practiced otherwise than as specifically explained and illustrated without departing from the scope of the attached claims.

What is claimed:

1. A drum brake assembly having a leading/trailing service brake and a duo-servo parking and emergency brake comprising:

a backing plate;

first and second opposed arcuate brake shoes supported relative to said backing plate and moveable outwardly into frictional engagement with an associated brake drum upon actuation of either the service brake or the parking and emergency brake, each of said first and second brake shoes including an arcuate table for supporting a friction pad and a web connected to said table, said web provided with an aperture formed intermediate the ends thereof;

a hydraulic actuator secured relative to said backing plate and disposed between and engageable with a first pair of adjacent ends of said brake shoes for hydraulically actuating the service brake;

a rotation preventing abutment secured relative to said backing plate and disposed between and engageable with a second pair of adjacent ends of said brake shoes;

a pivot lever pivotally supported relative to said first brake shoe and operatively coupled to exert an outward force on said first brake shoe when the parking and emergency brake is mechanically actuated, said pivot lever provided with an aperture formed intermediate the ends thereof;

first strut means disposed adjacent said hydraulic actuator and including one end coupled to said second brake shoe and an opposite end coupled to one end of said pivot lever;

second strut means disposed adjacent said rotation preventing abutment and including one end coupled to said second brake shoe and an opposite end coupled to an opposite end of said pivot lever;

parking and emergency brake actuating means carried by said brake assembly for mechanically actuating said pivot lever to urge said first brake shoe outwardly into engagement with the brake drum and thereby initiate duo-servo actuation of the parking and emergency brake through one of said first and second strut means; and hold down means extending through said apertures of said web of said first brake shoe and said pivot lever to secure said first brake shoe to said backing plate and to pivotally connect said pivot lever to said web of said first brake shoe.

2. The drum brake assembly according to claim 1 wherein said hold down means includes a hollow sleeve having a generally cylindrical elongated body which extends through said apertures of said web of said first brake shoe and said pivot lever.

3. The drum brake assembly according to claim 1 and further including means for spacing a substantial portion of said pivot lever from said web of said first brake shoe.

4. The drum brake assembly according to claim 3 wherein said means for spacing are formed in said pivot lever.

5. The drum brake assembly according to claim 1 wherein said first strut means includes means for automatically adjusting the effective length thereof in response to a predetermined amount of wear of said brake shoes.

6. The drum brake assembly according to claim 1 wherein said parking and emergency brake actuating means is a lever pivotally supported on said second brake shoe.

7. The drum brake assembly according to claim 1 wherein said second strut means includes identical length and width notches in opposed ends thereof 8. The drum brake assembly according to claim 1 wherein said first strut means includes an adjuster lever and a spring, said spring having one end connected to said adjuster lever and an opposite end connected to said pivot lever.

9. A drum brake assembly having a leading/trailing service brake and a duo-servo parking and emergency brake comprising:
a backing plate;
first and second opposed arcuate brake shoes supported relative to said backing plate and moveable outwardly into frictional engagement with an associated brake drum upon actuation of either the service brake or the parking and emergency brake, each of said first and second brake shoes including an arcuate table for supporting a friction pad and a web connected to said table;
a hydraulic actuator secured relative to said backing plate and disposed between and engageable with a first pair of adjacent ends of said brake shoes for hydraulically actuating the service brake;
a rotation preventing abutment secured relative to said backing plate and disposed between and engageable with a second pair of adjacent ends of said brake shoes;
a pivot lever pivotally supported relative to said first brake shoe and operatively coupled to exert an outward force on said first brake shoe when the parking and emergency brake is mechanically actuated;
first strut means disposed adjacent said hydraulic actuator and including one end coupled to said second brakes shoe and an opposite end coupled to one end of said pivot lever, said first strut means including an adjuster lever pivotally supported on said first brake shoe for automatically adjusting the effective length of said first strut means to compensate for wear of the brake shoes;
second strut means disposed adjacent said rotation preventing abutment and including one end coupled to said second brake shoe and an opposite end coupled to an opposite end of said pivot lever;
parking and emergency brake actuating means carried by said brake assembly for mechanically actuating said pivot lever to urge said first brake shoe outwardly into engagement with the brake drum and thereby initiate duo-servo actuation of the parking and emergency brake through one of said first and second strut means; and
hold down means extending through said aperture of said first brake shoe for securing said first brake shoe to said backing plate;
said pivot lever being pivotally supported on said first brake shoe generally intermediate said first and second strut means.

10. The drum brake assembly according to claim 9 wherein said pivot lever is disposed on one side of said web of said first brake shoe and said adjuster lever is disposed on an opposite side of said web of said first brake shoe.

11. The drum brake assembly according to claim 9 and further including a biasing means having a first end connected to said adjuster lever and a second end connected to said pivot lever.

* * * * *